Nov. 5, 1946.  A. M. FLOCKER  2,410,490
EYE PROTECTING SHIELD
Filed Feb. 17, 1942
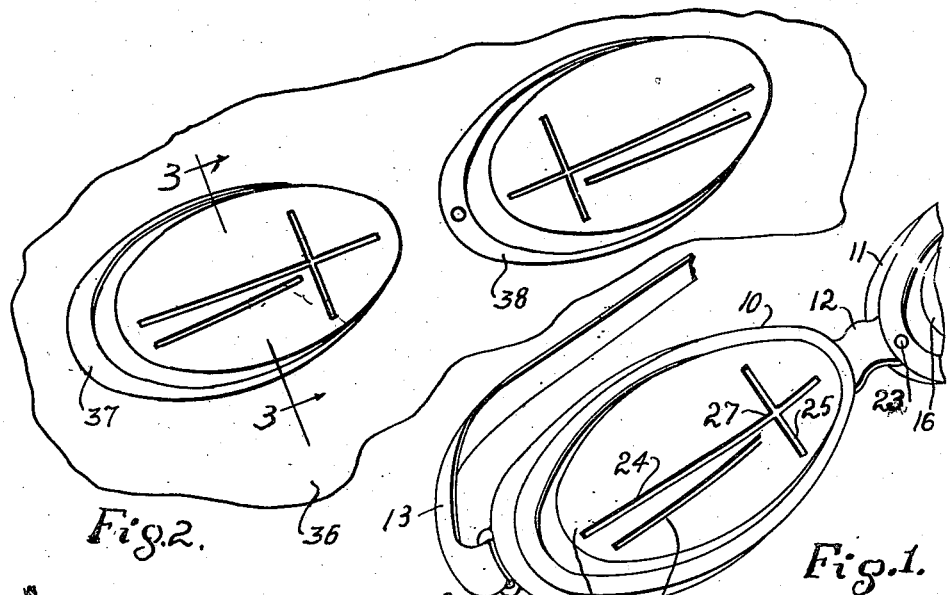
Fig.2.
Fig.1.
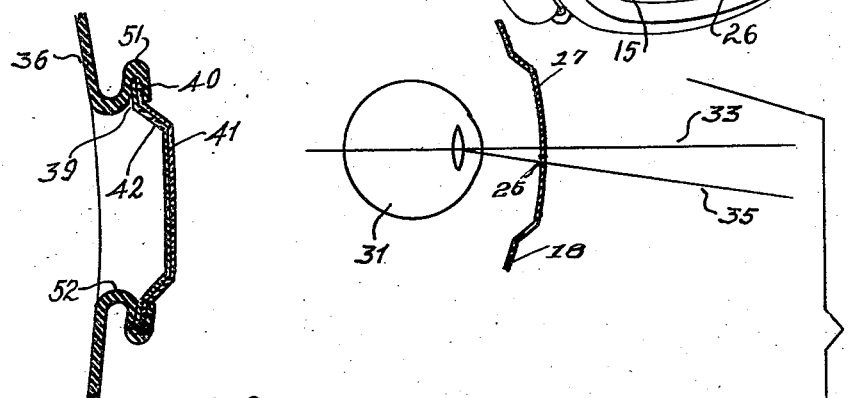
Fig.3.
Fig.4.
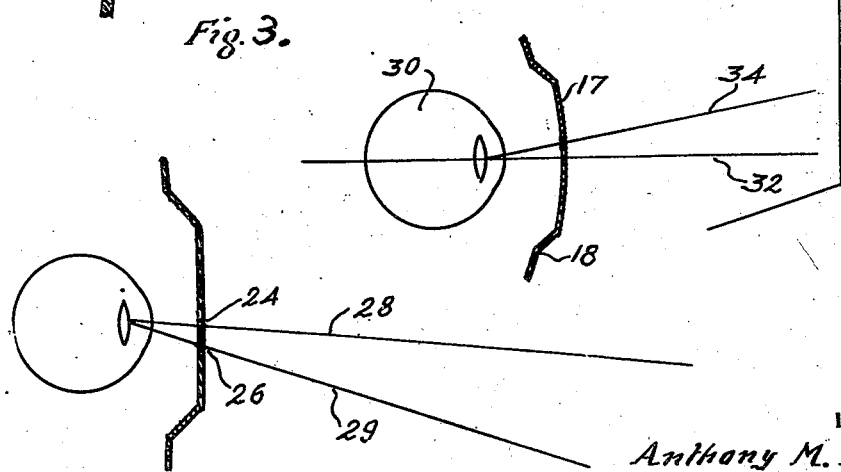
Fig. 5
INVENTOR
Anthony M. Flocker
BY
ATTORNEY Patented Nov. 5, 1946

2,410,490

UNITED STATES PATENT OFFICE 2,410,490

EYE PROTECTING SHIELD

Anthony M. Flocker, Brooklyn, N. Y., assignor to Kerlo Corporation, New York, N. Y., a corporation of New York Application February 17, 1942, Serial No. 431,294

2 Claims. (Cl. 2—14)

This invention relates to optical equipment and more particularly refers to improvements in devices for protecting the eyes of the wearer against injury from flying particles of glass or metal and also against the effects of light brilliant enough to be otherwise injurious to the sight and to interfere with clear vision.

Accordingly, my improved shield can be used under war conditions to protect the eyes against flying glass due to explosions and also against the glare of incendiary bombs which do generally burn with an intense light that no eye can bear.

Under normal conditions my invention will also prove extremely useful in shielding the eyes from the rays of the sun, or strong headlights when driving, or from the glare of a welding torch or of a snow field, and in all those instances where excessive glare or brilliancy of light intensity is likely to be injurious to the unprotected eye or to actually prevent vision.

The primary object of this invention, accordingly, is to provide a novel and improved arrangement of eye shields adapted to both effectively protect the eyes against objects flying through the air and reduce the intensity of the field of vision, without impairing the clarity and range of the vision itself.

Another object is to provide an eye shield of a novel and improved character, adapted to be used as an effective protection against injury deriving from flying fragments or excessive light and, under certain conditions, adapted also to be used as a part of a protective device, such as a gas mask, for instance, hermetically preventing poison or other gases from reaching the inside of the mask.

A further object is to provide a pair of eye protecting goggles or a novel and improved construction, adapted for use in protecting the eyes of the wearer against various dangers of a mechanical or optical nature, and adapted to be produced at relatively low cost.

A still further object is to provide an eye protective device of the character specified, comprising two laterally spaced eye shields of a simple and relatively inexpensive construction, making it possible to produce goggles and other similar devices in which the distance between the two shields is exactly adjusted to the characteristics of the wearer's visual system.

Other objects and advantages of the present invention will more fully appear as the description proceeds and will be set forth and claimed in the appended claims.

My invention is illustrated by way of example in the accompanying drawing, in which:

Fig. 1 is a fragmentary view in perspective of a pair of goggles embodying one form of my invention;

Fig. 2 is a fragmentary view in perspective illustrating my invention as applied to a gas mask;

Fig. 3 is a vertical section of the same through line 3—3 of Fig. 2;

Fig. 4 is a diagrammatic illustration showing the position of my eye shields with respect to the horizontal line of vision of the eyes of the wearer; and Fig. 5 is a diagrammatic illustration showing the direction of the vertical line of vision through the longitudinal slots provided in the eye shields.

As stated in the premises, the main object of my invention is to effectively protect the eyes of the wearer against injury from objects flying through the air without interfering with a sufficiently clear vision; incidentally, my eye shields will also constitute an effective protection against too intense light from any source.

One of the main characteristics of my eye shielding device is that the shields proper are made of impact resisting material and are provided with a system of slots so narrow as to make the penetration of glass or other solid particles practically impossible.

Another feature is a novel construction of shield and mounting therefor, whereby the shield can be quickly mounted in place without the use of any tools and without the necessity of using any rivets, pins, or other fastening means of like nature.

It follows that the shields forming part of my device are preferably made of metal or other impact resisting material, slotted at the proper places to provide the field of vision, although if protection against too intense light only is desired the shield may be made of transparent material rendered opaque in any convenient manner except for the linear portions delimiting the field of vision.

The goggles illustrated in Fig. 1 comprise two eye frames 10, 11, preferably made of rubber, connected by a bridge 12 and provided with fastening straps 13, only one of which is shown. Each eye frame constitutes a mounting for the eye shield proper, which is in the form of a flanged cup shaped member 15, 16, preferably made, as stated, of metal or other impact resisting material.

Referring more particularly to Fig. 4, it will be seen that each shield consists of a relatively shallow cup shaped portion 17, longitudinally curved along a line substantially parallel to the curve of the eyeball and preferably also somewhat curved in a vertical direction, said cup shaped section being formed with a peripheral flange 18.

The eye frames are formed with an inwardly directed peripheral groove 39, within which the flange 18 of the shield can be easily inserted and retained, as shown in Fig. 3.

It will be understood that the stretching and elastic qualities of rubber make it possible to force the shields in position with a tight fit, so that no rivets or similar fastening means are required. It is, however, desirable to exactly position the shields with respect to the slots or transparent portions delimiting the field of vision and, therefore, each shield is formed at some convenient point along its flange with an embossed projection adapted to register with a corresponding recess 23 provided in the eye frame.

In order to insure an effective protection against flying particles, each shield is formed with a very narrow longitudinal slot 24 crossed by an equally narrow slot 25, the width of said slots being of the order of one-thirty-second to three-sixty-fourths of an inch.

The longitudinal slot is preferably somewhat below a longitudinal line bisecting the shield so as to conform with the natural tendency of the eyes to look somewhat downward. The horizontal field of vision provided by the longitudinal slot 24 is preferably somewhat increased by providing an additional longitudinal slot 26 located below and at a relatively small distance from slot 24, said slot 26 being somewhat inclined outwardly with respect to said slot 24, its inner end pointing close to the point 27 where the vertical slot 25 crosses the longitudinal slot 24.

The object of the supplementary slot 26 is to make it possible for the eyes to see downwardly objects located at a close range; at the same time, said slot 26 improves the field of vision and its position and inclination with respect to slot 24 are such as to cause the images seen simultaneously through the two slots to substantially merge into a single image in the retina of the eye, as shown in Fig. 5 where 28, 29 represent the lines of vision passing through slots 24, 26, respectively.

It is also necessary to bear in mind that for vision to be effective the vertical slots 25 should not be directly in front of the pupils but should be slightly spaced inwardly therefrom, in order to permit the juxtaposition of the images formed on the retinae of the eyes by lines of vision concentrating to a single point from different angles.

In Fig. 4 I illustrate the necessity of having the vertical slots somewhat inwardly displaced with respect to the pupil of the eyes directly behind them. In the same 30, 31 designate a pair of eyes and 32, 33 designate parallel individual lines of vision passing through the center of the pupil of each eye. If the vertical slots in the shield coincided with the planes of the lines 32, 33, two separate images of the slots would appear on the retinae of the eyes, due to the fact that the shields are at a certain distance in front of the eyes in order to permit free movement of the eyelids. Since, except for very distant points, the lines of visions of the two eyes directed to points at ordinary distances are deflected inwardly to concentrate on such points, as indicated by lines 34, 35, it is necessary to set the vertical slots 25 in the right position in order to produce a single vision on the retinae.

In this connection it is also necessary to bear in mind that the distance between the eyes is different in different individuals. To take care of this condition the bridge 12 may be made adjustable in any well known manner but, in practice, I prefer to vary the position of the slots with respect to the body of the shield so as to vary the longitudinal distance between vertical slots 25 and the ends of the shield.

In this manner it is comparatively easy to supply the dealer with sets of shields having different inter-pupillary distances so that the purchaser can test his own requirements and secure a pair of goggles in which the vertical slots are properly spaced to suit his own conditions.

One of the advantages of having the shields formed with open slots is that they afford proper ventilation for the eyes and that they always insure clear vision. When transparent closed shields are used the perspiration is apt to befog the surfaces of the shields and thus interfere with proper vision.

However, my invention can also be applied in connection with gas masks and this application entails the necessity of the shield providing a hermetic closure against the passage of gases. Accordingly, referring to Figs. 2 and 3 it will be seen that the gas mask 36 may be formed integral with shield housings 37, 38, providing, like in the previous case, a peripheral groove 39 by means of the fold 51 within which the flange 40 of the shield 41 may be inserted.

The groove 39 is wide enough to permit the insertion of an additional member 42, nesting within the shield 41, said member 42 being made of Celluloid or other transparent material, both parts 41 and 42 being suitably cemented in place to provide the necessary hermeticity.

An annular fold 52 is formed beneath the groove 39 so that the folds 51 and 52 are substantially S-shaped in section. This permits lateral and axial adjustment of the shield under impact and normally yieldably retains the shield against movement with the slits in correct viewing position, as illustrated in Figs. 3 and 4.

From the foregoing it is apparent that I produce a device of a simple and inexpensive construction, adapted to effectively protect the eyes against various dangers of both mechanical and optical nature.

Minor constructional details may vary from those shown without departing from the inventive idea. The drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. An eye protecting device comprising a pair of cup-shaped slitted metal eye-shields, each having a flanged edge adapted to fit into a groove in a holder, a holder made of resilient material and having a pair of openings therein, an annular fold in the material about each of the openings extending outwardly from the opening and in spaced relation to the body of the holder, a second annular fold about each of the openings connected with the first fold and extending inwardly toward the opening to form with a side of said first fold a groove to receive the flanged edge of one of the eye-shields, each of said first folds forming a cushion for the flanged edge of a shield, providing for lateral and axial movement of the shield and normally yieldably retaining the shield against movement with the slits in correct viewing position.

2. An eye protecting device comprising a pair of cup-shaped slitted metal eye-shields each having a flanged peripheral edge, a cup-shaped shield of transparent material having a flanged peripheral edge nested into each of said metal shields, said flanged edges being adapted to fit into a groove in a holder, a holder made of resilient material and having a pair of openings therein, an annular fold in the material extending outwardly about each of the openings, a second annular fold in the material about each of the openings connected with the first fold and extending inwardly toward the opening to form a side of said first fold a groove to receive the flanged edges of the nested metal and transparent eye-shields, said two annular folds about each aperture forming an annular portion substantially S-shaped in section, each of said first folds permitting lateral and axial movement of a combined nested shield and forming a cushion intermediate the flanged edges thereof and the wearer.

ANTHONY M. FLOCKER.